United States Patent [19]

Schwab et al.

[11] Patent Number: 5,582,861
[45] Date of Patent: Dec. 10, 1996

[54] METHOD FOR REPAIR OF COATINGS ON CARBON - CARBON COMPOSITES

[75] Inventors: Stuart T. Schwab; Renee C. Graef, both of San Antonio, Tex.

[73] Assignee: Southwest Research Institute, San Antonio, Tex.

[21] Appl. No.: 212,021

[22] Filed: Mar. 11, 1994

Related U.S. Application Data

[63] Continuation-in-part of Ser. No. 764,793, Sep. 24, 1991, Pat. No. 5,294,425.

[51] Int. Cl.⁶ .................................................. B32B 35/00
[52] U.S. Cl. ..................... 427/140; 427/227; 427/387; 427/397.7; 427/419.7
[58] Field of Search .................................. 427/140, 227, 427/387, 397.7, 419.7

[56] References Cited

U.S. PATENT DOCUMENTS

| | | | |
|---|---|---|---|
| 4,158,687 | 6/1979 | Yajima et al. | 264/60 |
| 4,285,895 | 8/1981 | Mangels et al. | 264/65 |
| 4,324,843 | 4/1982 | Brennan et al. | 428/697 |
| 4,460,638 | 7/1984 | Haluska | 428/224 |
| 4,482,669 | 11/1984 | Seyferth et al. | 524/442 |
| 4,610,896 | 9/1986 | Veltri et al. | 427/140 |
| 4,618,529 | 10/1986 | Yamamura et al. | 428/224 |
| 4,689,188 | 8/1987 | Bhatt | 264/60 |
| 4,780,337 | 10/1988 | Seyferth et al. | 427/387 |
| 4,781,993 | 11/1988 | Bhatt | 428/698 |
| 5,166,001 | 11/1992 | Niebylski | 428/446 |
| 5,179,048 | 1/1993 | Niebylski | 501/88 |
| 5,258,229 | 11/1993 | Lum et al. | 428/408 |
| 5,294,425 | 3/1994 | Schwab | 423/324 |

FOREIGN PATENT DOCUMENTS 52-81309  7/1977  Japan.

*Primary Examiner*—Ngoclan Mai
*Attorney, Agent, or Firm*—John L. Sigalos

[57] ABSTRACT

A method of repairing damage to an oxidation-resistant layer on a carbon-carbon composite wherein a composition consisting essentially of a polymeric thermosetting polysilazane and a ceramic powder is applied to the damaged area, cured, and fired.

8 Claims, No Drawings

METHOD FOR REPAIR OF COATINGS ON CARBON - CARBON COMPOSITES

This invention was made under United States Government Contract No. F33657-86-C-2124 and the United States Government has a non-exclusive, non-transferrable, irrevocable, paid-up license to practice or have practiced for on behalf of the United States, this invention throughout the world.

CROSS REFERENCE TO RELATED APPLICATION

The instant application is a continuation-in-part of U.S. patent application Ser. No. 07/764,793 filed Sep. 24, 1991, now U.S. Pat. No. 5,294,425.

BACKGROUND OF THE INVENTION

The present invention relates to a method of repairing damage to an oxidation-resistant coating on a carbon-carbon composite. The invention is based, in part, on utilization of polymeric ceramic precursors disclosed in the parent application identified above, whose entire specification and claims are specifically incorporated herein by reference.

As is well known, carbon-carbon composites are formed of carbon fibers, typically woven into two-dimensional weaves which are stacked and surrounded by a dense carbon matrix. Such composites can be flat or shaped into three-dimensional structures and are widely utilized in the aerospace industry performing many vital components, such as in the Space Shuttle Orbiter Vehicle.

In order to prevent oxidation of the carbon in such carbon-carbon composites, it is common and necessary to apply a layer of an oxidation-resistant ceramic coating onto the surface of the composites. At present ceramic coatings composed primarily of silicon carbide or silicon nitride are used to protect carbon-carbon composites from oxidation. These coatings are applied by known and conventional techniques such as pack cementation, chemical vapor deposition, or a combination of these procedures. Although these methods produce coatings which impart a useful lifetime to the carbon structures, they require extreme conditions and specialized equipment for application. Structures with damage to the oxidation protection coating that result in exposure of the carbon-carbon substrate must be removed from the vehicle and shipped offsite for repair. Techniques which permit repair coatings in the field are or on the shop floor are not available and the result is costly in terms of time and manufacturing procedures, to repair damaged carbon-carbon structures and in the time required to make the repair.

SUMMARY OF THE INVENTION

The present invention overcomes the problems of the prior art to provide a method of repairing damage to the oxidation-resistant coatings on carbon-carbon composites, which repair can be accomplished in the field or on the shop floor and drastically reduce the time and cost associated with the present repair procedures.

Briefly stated, the present invention comprises a method of repairing damage to an oxidation-resistant layer on a carbon-carbon composite comprising applying to said damage a coating of a composition consisting essentially of a polymeric thermosetting polysilazane and a ceramic powder, curing the composition, and firing the composition coated carbon-carbon composite at a temperature and for a time sufficient to convert said polysilazane to a ceramic.

DETAILED DESCRIPTION

As noted above, the method of making the individual carbon-carbon composites themselves are well known and any conventional method can be utilized to form the same. In like manner, the oxidation-resistant ceramic coatings and the method of preparing them and applying them to the carbon-carbon composite are also well known. The instant invention is applicable to the method of repairing damage to the oxidation-resistant coating after the carbon-carbon composite has been put into use on an aerospace craft such as the Space Shuttle Orbiter Vehicle.

The critical part of the instant invention is a composition which can be utilized to repair the damage, which may be a crack, chip, hole, scratch, or any other damage.

The composition comprises a polymeric thermosetting polysilazane and a ceramic powder. As to the polymeric thermosetting polysilazane, it is preferably a perhydropolysilazane which can be thermally transformed into silicon nitride. Other specific examples are N-tert-butyl hydridopolysilazane and N-n-butyl hydridopolysilazane. The method of forming these preceramic precursor polymers is not a part of this invention and with respect to the polysilazanes is disclosed in the parent application noted above.

As to the ceramic powder utilized, it is preferred to use silicon carbide, silicon nitride, and the like, preferably one having a micron size no greater than about 10 microns and most preferably a sub-micron average particle size; less than about 0.5 micron. It is also possible to use ceramic whiskers and mixtures of the same with the ceramic powders. As used herein, the term "ceramic powder" is meant to include such whiskers. It is preferred that the purity of the powders and whiskers be 99% or greater.

As to proportions, it is preferred to use for each 100 wt. % of the composition about 50 to 80 wt. % of the ceramic powder and preferably 70 wt. %. It is best to load the polymer with as much powder as possible while maintaining a paste-like consistency.

The repair composition is formed by simply thoroughly mixing the components described above to form a substantially homogeneous mixture using conventional inert atmosphere/vacuum manifold or argon-filled drybox procedures. As is known, it is necessary to handle the uncured preceramic polymers using the known anaerobic and anhydrous conditions in combination with the just-described procedures.

To repair the damage to the individual carbon-carbon composites, the composition described above is applied to the damaged area by spraying, daubing, brushing, or any like procedure. The composites are then heated under applied pressure; i.e. about one atmosphere. No autoclave is required to cure the polymer. It is preferred to hold the assembly in a vacuum bag during curing and it is preferred to effect curing at about 200° C. The use of the vacuum bag gives one atmosphere pressure. Curing can be effected in about six hours, but the optimum temperature and time for any given composition can be determined by routine experimentation.

After cure, the structure containing the cured "green patch" is removed from the vacuum bag and fired. The firing is at a temperature and for a time sufficient to convert the polymeric ceramic precursor, used as part of the composition, to a ceramic. The optimum temperature and time for each adhesive will, thus, vary, but can be determined by routine experimentation. For perhydropolysilazane, for example, a temperature of about 1450° C. for about 30 minutes is suitable. It is preferred to carry out the firing under a flowing inert gas, such as nitrogen, and any conventional furnace can be used.

Additional coatings of pure polymer and polymer/powder mixtures are applied using the same procedure described above to fill in any small cracks that may result from the shrinkage occurring during the polymer-to-ceramic conversion process. Typically, no greater than six total coatings are necessary.

The invention will be further described in connection with the following example which is set forth for purposes of further illustration only.

EXAMPLE

Four coated RCC-3 specimens (2.78 inch diameter) were received from NASA-Johnson Space Center (NASA-JSC). A circular damage pattern was made in the oxidation-resistant coating by machining through the ceramic coating in the center of each disk. The damage pattern had an overall outer diameter of 0.5 inch, while the overall diameter of the exposed surface of the carbon-carbon composite was 0.25 inch in diameter. The damage pattern was machined completely through the oxidation-resistant coating. Before coating repair was initiated, the machined surfaces were roughed up with sandpaper to promote mechanical adhesion between the coating and the substrate. A thin layer of pure polymer perhydropolysilazane (PHPS) was applied with a small paint brush to the roughed up surface, followed by polymer loaded (70%) by weight with submicron $\alpha$-$Si_3N_4$ powder (H. C. Stark, LC-12), which was applied with a small spatula.

The repaired specimens were cured in a vacuum bag under ambient applied pressure at 180° C. for 6 hours.

After curing was complete, these "green patch" specimens were removed from the vacuum bag and fired to 1400° C. under flowing nitrogen. A second coating of powder-loaded polymer was applied, followed by three coatings of pure polymer (no powder loading), using the curing and firing procedure described above for each, for a total of five coating cycles. After the fifth coating cycle, the specimens were fired to 1700° C. under nitrogen.

While, for purposes of experimentation, the repair was used only against the circular damage pattern, the procedure can be used against all manner of scratches, chips, dings, cuts, holes and the like. In addition, lower firing temperatures are likely to provide sufficient protection, the 1700° C. firing temperature used in this specific example was chosen only because of the anticipated test conditions. Also, the nature of the powder additive is not critical, as long as it is a refractory material, such as silicon nitride, silicon carbide, and the like. Also, other means of maintaining an inert atmosphere and register of the repair material against the repair site while heat is applied are capable of producing adequate green patches. It is not necessary that the powder-loaded polymer be applied with a spatula or that subsequent coatings of PHPS be applied with a brush. Other methods, such as spray-gun, doctor blade, injector gun, and the like are fully compatible with this repair method.

The samples prepared as noted above were tested at The Johnson Space Center in the 10MW Atmospheric Reentry Materials & Structures Evaluation Facility (ARMSEF). Specimen surface temperatures were determined using a 0.865 µ pyrometer. The experimental matrix is summarized in Table 1. Note that the two specimens which had undergone only five coating cycles were subjected to two test cycles.

TABLE 1

| Sample | Coating Cycles | Test Cycles | Temp. (°C.) | Press. (psf) | Cycle Duration (seconds) | Accumulated Cycle Time |
|---|---|---|---|---|---|---|
| 1 | 7 | 1 | 1593 | 100 | 900 | 900 |
| 2 | 5 | 1 | 1649 | 100 | 450 | 450 |
| 2 |   | 2 | 1649 | 100 | 450 | 900 |
| 3 | 5 | 1 | 1704 | 100 | 450 | 450 |
| 3 |   | 2 | 1704 | 100 | 450 | 900 |
| 4 | 7 | 1 | 1840 | 100 | 118 | 118 |

The test results reveal that no damage to the underlying carbon-carbon substrate in tests cycles with temperatures less than 1700° C.

Despite its simplicity, the preceramic polymer repair technique provided excellent protection to the RCC-3 substrate to temperatures as high as 1700° C. under simulated re-entry conditions for short periods. The polymer-derived $Si_3N_4$ may undergo the transition from passive to active oxidation at temperatures lower than those found for $Si_3N_4$ processed through other techniques; however, improved processing to yield stoichiometric and crystalline $Si_3N_4$ has the potential to raise substantially the active oxidation threshold.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A method of repairing damage to an oxidation-resistant layer on a carbon-carbon composite comprising applying to said damage a coating of a composition consisting essentially of a polymeric thermosetting polysilazane and a ceramic powder, curing the composition, and firing the composition-coated carbon-carbon composite at a temperature and for a time sufficient to convert said polysilazane to a ceramic.

2. The method of claim 1 wherein the damage is first primed with said polymeric thermosetting polysilazane and said composition then placed thereover.

3. The method of claim 1 wherein said polysilazane is perhydropolysilazane and said ceramic powder is silicon nitride, said silicon nitride comprising up to 80% by weight of said composition.

4. The method of claim 2 wherein said polysilazane is perhydropolysilazane and said ceramic powder is silicon nitride, said silicon nitride comprising up to 80% by weight of said composition.

5. The method of claim 3 wherein curing is effected under one atmosphere applied pressure on the damaged portion of the carbon-carbon composite.

6. The method of claim 4 wherein curing is effected under one atmosphere applied pressure on the damaged portion of the carbon-carbon composite.

7. The method of claim 5 wherein at least one additional coating of said composition is applied over said fired coating and said at least one additional coating is cured and fired in the same manner as said first coating.

8. The method of claim 6 wherein at least one additional coating of said composition is applied over said fired coating and said at least one additional coating is cured and fired in the same manner as said first coating.

\* \* \* \* \*